US008546310B2

(12) United States Patent
Lewis et al.

(10) Patent No.: US 8,546,310 B2
(45) Date of Patent: Oct. 1, 2013

(54) DENSITY-MATCHED SUSPENSIONS AND ASSOCIATED METHODS

(75) Inventors: Sam Lewis, Duncan, OK (US); Michael Szymanski, Duncan, OK (US); Christopher Gordon, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 432 days.

(21) Appl. No.: 12/792,285

(22) Filed: Jun. 2, 2010

(65) Prior Publication Data

US 2010/0240803 A1 Sep. 23, 2010

Related U.S. Application Data

(62) Division of application No. 12/273,711, filed on Nov. 19, 2008, now Pat. No. 7,757,766.

(51) Int. Cl.
*C09K 8/46* (2006.01)
*C09K 8/60* (2006.01)

(52) U.S. Cl.
USPC ........... 507/267; 507/219; 507/260; 507/262; 507/265; 507/268; 166/285; 523/130

(58) Field of Classification Search
None
See application file for complete search history.

(56) References Cited

U.S. PATENT DOCUMENTS

| | | | |
|---|---|---|---|
| 2,217,926 A | 10/1940 | Van Campen et al. | |
| 2,933,135 A | 4/1960 | Johnson | |
| 3,416,606 A | 12/1968 | Watanabe | |
| 4,609,487 A * | 9/1986 | Burkhardt et al. | 516/104 |
| 4,772,646 A | 9/1988 | Harms et al. | |
| 5,045,588 A * | 9/1991 | Arranaga | 524/445 |
| 5,149,370 A | 9/1992 | Olaussen et al. | |
| 5,184,680 A | 2/1993 | Totten et al. | |
| 5,775,425 A | 7/1998 | Weaver et al. | |
| 5,853,048 A | 12/1998 | Weaver et al. | |
| 5,871,049 A | 2/1999 | Weaver et al. | |
| 5,897,699 A | 4/1999 | Chatterji et al. | |
| 6,063,738 A | 5/2000 | Chatterji et al. | |
| 6,547,871 B2 | 4/2003 | Chatterji et al. | |
| 6,601,647 B2 | 8/2003 | Brothers et al. | |
| 6,620,769 B1 * | 9/2003 | Juppe et al. | 507/103 |
| 6,631,766 B2 | 10/2003 | Brothers et al. | |
| 6,644,405 B2 | 11/2003 | Vijn et al. | |
| 6,648,961 B2 | 11/2003 | Brothers et al. | |
| 6,660,078 B2 | 12/2003 | Brothers | |
| 6,666,268 B2 | 12/2003 | Griffith et al. | |
| 6,668,929 B2 | 12/2003 | Griffith et al. | |
| 6,716,282 B2 | 4/2004 | Griffith et al. | |
| 6,811,603 B2 | 11/2004 | Brothers et al. | |
| 6,814,798 B2 | 11/2004 | Vijn et al. | |
| 6,830,105 B2 | 12/2004 | Thesing | |
| 6,962,200 B2 | 11/2005 | Nguyen et al. | |
| 6,983,800 B2 | 1/2006 | Chatterji et al. | |
| 7,040,403 B2 | 5/2006 | Nguyen et al. | |
| 7,063,150 B2 | 6/2006 | Slabaugh et al. | |
| 7,066,258 B2 | 6/2006 | Justus et al. | |
| 7,093,658 B2 | 8/2006 | Chatterji et al. | |
| 7,147,705 B2 | 12/2006 | Chatterji et al. | |
| 7,393,814 B2 | 7/2008 | Chatterji et al. | |
| 8,211,236 B2 * | 7/2012 | Satyavolu et al. | 127/71 |
| 2003/0181542 A1 | 9/2003 | Vijn et al. | |
| 2005/0011412 A1 | 1/2005 | Vijn et al. | |
| 2005/0272913 A1 | 12/2005 | Mauldin et al. | |
| 2006/0045891 A1 | 3/2006 | Lovalenti | |
| 2006/0148654 A1 * | 7/2006 | Dobson et al. | 507/110 |
| 2006/0283357 A1 | 12/2006 | Santra et al. | |
| 2007/0022917 A1 | 2/2007 | Chatterji et al. | |
| 2010/0196734 A1 * | 8/2010 | Svec et al. | 428/548 |

FOREIGN PATENT DOCUMENTS

| | | |
|---|---|---|
| EP | 2058342 A1 | 5/2009 |
| WO | 2004/050028 | 6/2004 |

OTHER PUBLICATIONS

"Carnation White Mineral Oil," Safety Data Sheet, Version 1.4; Sonneborn Refined Products, Date of Issue Jan. 3, 2012; 5 pgs.
"Medicinal grade White Oil," Marcol 52; ExxonMobil; http://www.exxonmobil.com/Malaysia-English/Specialities/PDS/GLXXEENSPCEMMarcol...; © 2001; 3 pgs.
Material Safety Data Sheet; Sigma-Aldrich, Version 5.1, Print Date May 14, 2013; 6 pgs.
"Natrosol® Hydroxyethylcellulose, A Nonionic Water-Soluble Polymer;" Aqualon; © Hercules Incorporated 1999; 24 pgs.
Foreign Search Report for PCT/GB2009/002694, dated Mar. 2, 2010.
Halliburton brochure entitled "Cementing Halad® -23 EXP,"H04566, Jul. 2006.
Halliburton brochure entitled "Cementing Halad® -322 LXP,"H02082, Jan. 2006.
Halliburton brochure entitled "Cementing Halad® -688 and -Halad® -688 EXP additives,"H05002, Jun. 2006.
Halliburton brochure entitled "Cementing Suspend HT™ Additive, Suspending Agent," H01462, Jul. 2006.
Halliburton brochure entitled "Cementing WG-17 LXP™ Free-Water Control Agent," H02150, May 2006.

(Continued)

*Primary Examiner* — John J Figueroa
(74) *Attorney, Agent, or Firm* — Craig W. Roddy; Baker Botts L.L.P.

(57) ABSTRACT

Of the many compositions and methods provided herein, an example method includes a method of treating a subterranean formation that comprises combining components comprising water and a density-matched suspension to prepare a treatment fluid, wherein the density-matched suspension comprises a suspending liquid and a solid particle suspended in the suspending liquid, and introducing the treatment fluid into a well bore. An example composition includes a suspension that comprises a suspending liquid comprising a hydrophobic liquid, wherein the hydrophobic liquid hydrolyzes when placed in contact with an aqueous fluid to form hydrophilic products, and a solid particle suspended in the suspending liquid, wherein the suspension is a density-matched suspension.

11 Claims, No Drawings

(56) References Cited

OTHER PUBLICATIONS

Huntsman brochure entitled "JEFFSOL® Alkylene Carbonates," 1112-501, 2001.
API Specification 10, "API Specification for Materials and Testing for Well Cements," Fifth, Ed., pp, 7, 19-21, Jul. 1, 1990.
Wikipedia Encyclopedia Online, "Propylene carbonate," Mar. 30, 2007.
Wikipedia Encyclopedia Online, "Suspension (chemistry)," Nov. 26, 2007.

* cited by examiner

DENSITY-MATCHED SUSPENSIONS AND ASSOCIATED METHODS

CROSS REFERENCE TO RELATED APPLICATIONS

The present invention is a divisional of U.S. patent application Ser. No. 12/273,711, entitled "Density-Matched Suspensions and Associated Methods," filed on Nov. 19, 2008, now U.S. Pat. No. 7,757,766 the entire disclosure of which is incorporated herein by reference.

BACKGROUND

The present invention relates to density-matched suspensions and, more particularly, in certain embodiments, to density-matched suspensions that comprise a solid particle suspended in a suspending liquid and associated methods of use.

Suspensions may be used in any number of applications where it may be desirable to suspend a solid particle in a suspending liquid for extended periods of time. For example, such applications may include cosmetics, pharmaceuticals, foodstuffs, agricultural products (e.g., fertilizers, pesticides, etc.), decorative mixtures, and downhole applications. In downhole applications, for example, downhole additives (such as water-soluble polymers) may be suspended in inert organic liquids to facilitate their handling and mixing with well treatment fluids, such as cement compositions.

In general, a suspension is typically formulated so that the solid particle should not undesirably settle out of the suspending liquid. To prevent sedimentation of the solid particle, the suspension typically may rely on viscosity. As used herein, a suspension that relies at least substantially on viscosity to prevent sedimentation of the solid particle is referred to as a "viscosity-controlled suspension." By way of example, the liquid generally may have a viscosity sufficient to slow the sedimentation rate of the solid particle, which typically has a density greater than the suspending liquid. To provide the necessary viscosity, a suspending agent (e.g., hydrophobic polymers, organophilic clays, etc.) may be included in the viscosity-controlled suspension. However, reliance on viscosity to prevent sedimentation may be problematic. For instance, the viscosity of the suspending liquid may change with time such that the suspending liquid may not have a sufficient viscosity to prevent the undesired sedimentation of the solid particle. Accordingly, the viscosity-controlled suspensions may not have the desired shelf life.

As previously mentioned, downhole additives may be suspended in inert organic liquids to facilitate their handling and mixing with well treatment fluids. For example, fluid-loss-control additives (such as water-soluble polymers) may be suspended in an organic liquid to facilitate their handing and mixing with a cement composition. Such suspensions generally contain a high concentration of the fluid-loss-control additive, the organic liquid (e.g., mineral oil), a surfactant for enhancing the release of the polymer into an aqueous liquid, and a viscosifying agent (e.g., an organophilic clay). These suspensions, however, may be environmentally undesirable, particularly in highly regulated regions, because the organic liquid and/or the viscosifying agents may fail to satisfy the aquatic toxicity and/or biodegradability requirements that may be imposed in these regions. Moreover, in cement compositions that have been foamed, the organic liquid may lead to the undesired breaking of the foam, with a concomitant release of the foaming gas, causing high formation pressures and possible fracturing of the formation. Further, in cement compositions, the organic liquid may not be beneficial to the properties of the cement, in that the organic liquids do not bind to the cement, taking up volume that could be used to enhance the cement matrix.

SUMMARY

The present invention relates to density-matched suspensions and, more particularly, in certain embodiments, to density-matched suspensions that comprise a solid particle suspended in a suspending liquid and associated methods of use.

In one embodiment, the present invention comprises a method of treating a subterranean formation comprising: combining components comprising water and a density-matched suspension to prepare a treatment fluid, wherein the density-matched suspension comprises a suspending liquid and a solid particle suspended in the suspending liquid; and introducing the treatment fluid into a well bore that penetrates the subterranean formation.

In another embodiment, the present invention comprises a method of cementing in a subterranean formation comprising: combining components a cement, water, and a density-matched suspension to form a cement composition, wherein the density-matched suspension comprises a suspending liquid and a solid particle suspended in the suspending liquid; and introducing the cement composition into a well bore that penetrates the subterranean formation.

In another embodiment, the present invention comprises a method comprising: selecting a target density for a suspension based at least on a solid particle to be suspended in a density-matched suspension; selecting two or more hydrophobic liquids having densities both higher and lower than the target density, wherein the hydrophobic liquids hydrolyze when placed in contact with an aqueous fluid to form hydrophilic products; combining first components comprising the hydrophobic liquids to form a mixture having about the target density; and combining second components comprising the mixture and the solid particle to be suspended to form the density-matched suspension.

In another embodiment, the present invention comprises a suspension comprising: a suspending liquid comprising a hydrophobic liquid, wherein the hydrophobic liquid hydrolyzes when placed in contact with an aqueous fluid to form one or more hydrophilic products; and a solid particle suspended in the suspending liquid, wherein the suspension is a density-matched suspension.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to density-matched suspensions and, more particularly, in certain embodiments, to density-matched suspensions that comprise a solid particle suspended in a suspending liquid and associated methods of use.

There may be several potential advantages to the methods and compositions of the present invention. One of the many potential advantages is that the density-matched suspensions may be more resistant to sedimentation of the solid particle than viscosity-controlled suspensions. Another potential advantage is that the density-matched suspensions may be more environmentally acceptable than current suspensions that utilize mineral oil. For example, the suspending liquid of the density-matched suspension may comprise a hydrophobic liquid that hydrolyzes to form one or more hydrophilic compounds (e.g., alcohols, diols, etc.) that may be miscible in aqueous liquids, reducing or even eliminating the undesired oil residue from the suspension. Without the undesired oil residue, the density-matched suspension may not lead to the undesired breaking of a foam and, thus, may be suitable for foaming applications, such as foamed cement compositions.

I. Examples of Density-Matched Suspensions

As previously mentioned, the density-matched suspensions generally comprise a suspending liquid and a solid particle suspended in the suspending liquid. As used herein, the term "density-matched suspension" refers to a suspension wherein the specific gravity of the suspending liquid is within about 5% of the specific gravity of the solid particle. In certain embodiments, the specific gravity of the suspending liquid may be within about 1% of the specific gravity of the solid particle and, alternatively, within about 0.1%. In contrast to viscosity-controlled suspensions, wherein settling of the suspended particle is prevented from settling due to viscosity, density-matched suspensions rely on matching of the specific gravity of the suspending liquid and the solid particle to prevent settling. Accordingly, by matching the specific gravity of the suspending liquid and the solid particle, the solid particle should not have a propensity to settle.

In accordance with embodiments of the present invention, the density-matched suspensions may be more resistant to sedimentation of the solid particle than viscosity-controlled suspensions. Accordingly, the density-matched suspensions may have an extended shelf life. As used herein, the term "shelf life" refers to the period of time a suspension can sit static with the suspended particles at least substantially homogeneously mixed in the suspending liquid. For the purposes of this invention, a suspension is considered to be substantially homogenously mixed if the concentration gradient does not adversely effect the desired performance of the product. By way of example, a suspension may be substantially homogenously mixed where the concentration by weight of the suspended particle in the top ¼ of the suspension is within about 15% of the concentration by weight of the suspended particle in the bottom ¼ of the suspension, alternatively, within about 1%, and alternatively, within about 5%.

The suspensions formed in accordance with embodiments of the present invention allow for the matching of densities between the suspending liquid and the solid particle suspended therein. Within certain density range differences between the suspending liquids and the suspended particle, such matching may increase the long-term stability of the suspensions. Further, in certain embodiments, the suspending liquid may comprise a hydrophobic liquid that may be hydrolyzed to form hydrophilic products when placed in contact with aqueous compositions, especially compositions having high or low pH, such as less than about 5 or greater than about 9. This may allow the incorporation of additives in non-aqueous suspensions into systems for which residual oils may be problematic, for example, in foamed cement compositions, among others. Specifically, in foamed cement compositions used for well cementing methods, residual oils may lead to breaking of the foam, with a concomitant release of the foaming gas, causing high formation pressures and possible fracturing of the formation.

In general, the suspending liquid may be any suitable liquid for suspending the solid particle. In certain embodiments, the suspending liquid may comprise a hydrophobic liquid. For example, the suspending liquid may comprise a mixture of two or more hydrophobic liquids that have different densities. In certain embodiments, hydrophobic liquids selected may be hydrolyzed in water solutions at various pH levels to form hydrophilic compounds, e.g., alcohols and diols. The hydrolysis generally should eliminate the hydrophobic nature of the mixture, forming products that may be miscible in aqueous fluids. Solid particles carried in the suspending liquid would then be deposited into the resulting aqueous fluid, for example. In certain embodiments, a surfactant may be included in the suspension, for example, to water wet the solid particle and, thus, facilitate mixing of the solid particle into an aqueous fluid. Hydrophobic liquids that may be used in embodiments of the present invention include, but are not limited to, cyclic carbonates, ketals, acetals, orthoesters, orthoformates, and combinations thereof. The general chemical structures of these compounds are shown in Formulas I-III, below, wherein Formula I represents the general structural formula for a cyclic carbonate, Formula II represents the general structural formula for a ketal or acetal, and Formula III represents the general structural formula for an orthoester or orthoformate.

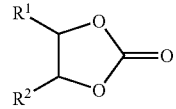

Formula I

A cyclic carbonate is represented by the structure shown in Formula I, in which $R^1$ and $R^2$ may be independently selected to be hydrogen, or an alkyl group having from 1 to 5 carbons. If an alkyl group is present, the alkyl group may have additional substituents, for example, hydroxyl groups.

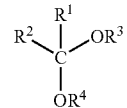

Formula II

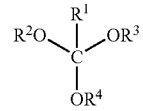

Formula III

In each of the structures shown in Formula II and III, $R^1$ may be a hydrogen or an alkyl group containing 1-5 carbons, and $R^2$-$R^4$ may be independently selected to be alkyl groups containing 1-5 carbons. If $R^1$ in the ketal shown in Formula II is a hydrogen group, then the compound is called an acetal, and if $R^1$ in the orthoester shown in Formula III is a hydrogen group, then the compound is called an orthoformate.

Specific examples of compounds that are included in the general structural formulas above may include, but are not limited to, the cyclic carbonates propylene carbonate (4-methyl-1,3-dioxolan-2-one) and 1,2-butylene carbonate (4-ethyl-1,3-dioxolan-2-one). The structural formulas for these compounds are shown in Formula IV and V, below. As the density of propylene carbonate is around 1.200 g/cm³ (at 25° C.), and the density of 1,2-butylene carbonate is around 1.141 g/cm³ (at 25° C.), a mixture of these two components may be used to achieve a density at any point between these two values. This density may be selected to match the density of a solid particle such as a hydrophilic polymer, enabling the formation of stable, long-term suspensions of the solid particle in the suspending liquid.

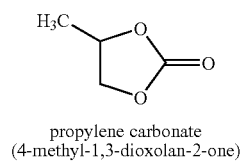

propylene carbonate
(4-methyl-1,3-dioxolan-2-one)

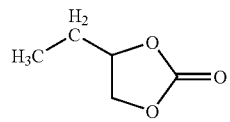

1,2-butylene carbonate
(4-ethyl-1,3-dioxolan-2-one)

As a non-limiting example of how such compounds may be used to form a stable suspension, a polymer, polyacrylonitrile, may have a neat density of about 1.183 g/cm³ (at 25° C.). In an embodiment of the present invention, a suspending liquid containing about 0.875 mol % propylene carbonate and about 0.125 mol % 1,2-butylene carbonate may match this density. If particles of polyacrylonitrile were suspended in this suspending liquid, it is believed that the particles could take months or even years to separate from the solvent. Other effects besides buoyant forces may impact this stability. However, these suspending liquids may provide higher stability than currently used suspensions in which the density of the solvent does not match the density of the suspended particles and viscosity may be used to slow separation.

Other compounds from the classes discussed above may be used to obtain suspending liquids having lower densities. Such compounds may include, for example, the orthoester 1,1,1-trimethoxyethane, having the chemical structure shown in Formula VI, and a density of about 0.9440 g/cm³ (at 25° C.), and the ketal 2,2-dimethoxypropane, which has a density of about 0.8470 g/cm³ (at 25° C.), and the chemical structure shown in Formula VII.

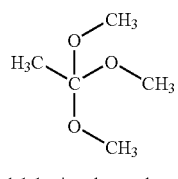

1,1,1-trimethoxyethane

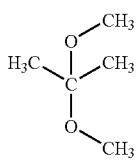

2,2,-dimethoxypropane

Yet other compounds may be used in the oil mixtures to achieve higher densities. For example, ethylene carbonate, with the chemical structure shown in Formula VIII, has a density of about 1.338 g/cm³ (at 25° C.), while glycerine carbonate, with the chemical structure shown in Formula IX, has a density of about 1.4 g/cm³ (at 25° C.).

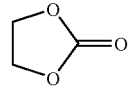

ethylene carbonate
(1,3-dioxolan-2-one)

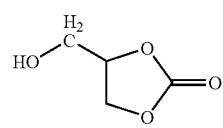

glycerine carbonate
(4-hydroxymethyl-1,3-dioxolan-2-one)

As noted above, the suspending liquids may be hydrolyzed to form hydrophilic products when placed in contact with aqueous fluids. For example, the cyclic carbonates, such as those shown in Formula I, IV, V, VIII, and IX, may quickly hydrolyze when placed in contact with aqueous compositions having either a low pH (e.g., less than about 5) or a high pH (e.g., greater than about 9). One skilled in the art will recognize that the hydrolysis rate of cyclic carbonates is dependent on the pH, occurring more quickly as the pH gets further away from neutral. By way of further example, acetals or ketals, as shown in Formulas II, III, VI, and VII may quickly hydrolyze when placed in contact with water, regardless of the pH.

Solid particles that may be suspended in the suspending liquids generally may have a density about the same of the density of the suspending liquid. By way of example, where a mixture of hydrophobic liquids may be used, the solid particle may generally have densities between the upper and lower densities of the hydrophobic liquids used in the suspending liquid, e.g., between about 0.85 g/cm³ (at 25° C.) and 1.4 g/cm³ (at 25° C.) in certain embodiments. It is believed that matching of the density of the suspending liquid to the density of the solid particles to be suspended would control the stability, and, thus, the effective life, of the suspension. If the densities are precisely matched, the suspension may be stable for an indefinite period of time. If the densities are within about 1% of each other, the suspensions should, for example, be stable for months, or even years, before the suspended material floats or settles out of oil mixture. If the suspensions are within about 5% of each other, the suspensions should, for example, be stable for months. Depending on the application, this may be sufficient.

The amount of the material that may be included in the suspensions of the present invention depends on, for example, the properties of the solid particle and the desired properties of the suspension. For example, the solid particle may be present in the suspension in an amount in the range of about 3% to about 80% by weight of the suspension. In some embodiments, the solid particle may be present in the suspension in an amount in the range of about of about 10% to about 50% by weight of the suspension, or alternatively of about 20% to about 45% by weight of the suspension.

The suspensions of the present invention may be used in any number of applications where solid particles are to be suspended in a suspending liquid for extended periods of time. For example, such applications may include cosmetics (using the carbonates, for example, which have low toxicity), agricultural products (e.g., fertilizers, pesticides), decorative mixtures, downhole additives for oil wells, and the like. An exemplary embodiment may use the oil mixtures of the present techniques to make stable suspensions of fluid-loss-control additives for cement compositions. One of ordinary skill in the art will recognize that the density-matched suspensions of the present techniques may be used for forming other types of additives in any number of other cement compositions.

As described above, a suspending agent may also be included in the suspensions of the present invention to increase the viscosity of the suspension. While optional, the suspending agent may be used to slow the separation of a suspended material, allowing a wider range between the density of the material to be suspended and the solution. Such agents may include hydrophobic polymers, including, but not limited to, styrene-butadiene copolymers, styrene-butadiene rubbers, polystyrene, polybutadiene, and combinations thereof. Other agents that may be used to increase the viscosity of the suspension include organophilic clays, among others. The use of such agents may also modify the density of the oil mixture, allowing further control over the final density of the suspension.

II. Examples of Uses of Density-Matched Suspensions in Cement Compositions

In accordance with the embodiments of the present invention, cement compositions generally may include a cement, water, and a polymeric fluid-loss-control additive. As will be appreciated by those of ordinary skill in the art, with the benefit of this disclosure, the polymeric fluid-loss-control additive may have been suspended in a density-matched suspension prior to combination with the cement composition. In addition to polymeric fluid-loss-control additives, other solid particle included in the cement composition may also be provided in density-matched suspensions, as desired.

Those of ordinary skill in the art will appreciate that the cement compositions generally should have a density suitable for a particular application. By way of example, the cement composition may have a density in the range of about 4 pounds per gallon ("lb/gal") to about 20 lb/gal. In certain embodiments, the cement compositions may have a density in the range of about 8 lb/gal to about 17 lb/gal. Embodiments of the cement compositions may be foamed or unfoamed or may comprise other means to reduce their densities, such as hollow microspheres, low-density elastic beads, or other density-reducing additives known in the art. For example, a foamed cement composition may be used that further comprises a gas and a surfactant for foaming and/or stabilizing the foamed cement composition. Those of ordinary skill in the art, with the benefit of this disclosure, will recognize the appropriate density for a particular application.

Embodiments of the cement compositions generally comprise a cement. A variety of cements may be utilized in these compositions, including, but not limited to, hydraulic cements that set and harden by reaction with water. Such cements may contain a variety of elements including calcium, aluminum, silicon, oxygen, and/or sulfur. For example, suitable cements may include Portland cements, pozzolana cements, gypsum cements, high-alumina-content cements, slag cements, and silica cements, among others, and combinations thereof. In certain exemplary embodiments, the cement may include a Portland cement. In some embodiments, the Portland cements that are suited for use in the present techniques are classified as Class A, C, H, and G cements according to American Petroleum Institute, *API Specification for Materials and Testing for Well Cements*, API Specification 10, Fifth Ed., Jul. 1, 1990.

The water used in embodiments of the cement compositions may be freshwater, saltwater (e.g., water containing one or more salts dissolved therein), brine (e.g., saturated saltwater produced from subterranean formations), seawater, or combinations thereof. Generally, the water may be from any source, provided that it does not contain an excess of compounds that may undesirably affect other components in the cement composition. The water may be present in an amount sufficient to form a pumpable slurry. More particularly, the water may be present in an amount in the range of about 33% and about 200% by weight of the cement ("bwoc"). In some exemplary embodiments, the water may be present in an amount in the range of about 35% and about 70% bwoc.

As described above, the cement compositions may be foamed with a gas, in certain embodiments. The gas utilized in the foamed cement compositions may be any gas suitable for foaming a cement composition, including, but not limited to, air, nitrogen, and combinations thereof. Generally, the gas should be present in the foamed cement compositions of the present techniques in an amount sufficient to form a suitable foam. In some embodiments, the gas may be present in an amount in the range of about 10% and about 80% by volume of the composition.

Any suitable surfactant may be used in the foamed cement composition for facilitating the foaming of a cement composition and/or also stabilize the resultant foamed cement composition formed therewith. Suitable surfactants may include, but are not limited to: a mixture of an ammonium salt of an alkyl ether sulfate, a cocoamidopropyl betaine surfactant, a cocoamidopropyl dimethylamine oxide surfactant, sodium chloride, and water; a mixture of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; a mixture of an ethoxylated alcohol ether sulfate surfactant, an alkyl or alkene amidopropyl betaine surfactant, and an alkyl or alkene dimethylamine oxide surfactant; an aqueous fluid of an alpha-olefinic sulfonate surfactant and a betaine surfactant; and combinations thereof. An example of a suitable hydrolyzed keratin is described in U.S. Pat. No. 6,547,871, the disclosure of which is incorporated herein by reference. An example of a suitable mixture of an ethoxylated alcohol ether sulfate surfactant, an alkyl or alkene amidopropyl betaine surfactant, and an alkyl or alkene dimethylamine oxide surfactant is described in U.S. Pat. No. 6,063,738, the disclosure of which is incorporated herein by reference. An example of a suitable aqueous fluid of an alpha-olefinic sulfonate surfactant and a betaine surfactant is described in U.S. Pat. No. 5,897,699, the disclosure of which is incorporated herein by reference. In an embodiment, the surfactant may include a mixture of an ammonium salt of an alkyl ether sulfate, a cocoamidopropyl betaine surfactant, a cocoamidopropyl dimethylamine oxide surfactant, sodium chloride, and water.

Generally, the surfactants for foaming and/or stabilizing should be present in the foamed cement compositions of the present techniques in an amount sufficient to provide a suitable foam. In exemplary embodiments, the surfactant may be present in an amount in the range of about 0.8% and about 10% by volume of the water ("bvow") present in the foamed cement composition.

As previously discussed, fluid-loss-control additives often may be provided in oil-based suspensions containing suspended hydrophilic polymers, in addition to other ingredients, such as clays, surfactants, and other components. These suspensions generally allow more efficient distribution of the additives, for example, the liquid suspensions may be injected under pressure into a pipeline containing a flowing stream of cement slurry. However, the long-term storage of these suspensions may be problematic. For instance, polymer suspensions tend to separate over time, with the polymer particles settling or floating out of the solution. The separated particles contact each other and may form a gelled mass, for example. This gel may be very difficult to remix into a homogeneous solution, for example, leading to a varying amount of suspended polymer being injected into the flowstream, or in addition the settled material may lead to less active product available for use in the suspension and the concurrent loss of product at the bottom or top of tanks and vessels. If the product is not used within a few months, in certain embodiments, such separation may prevent the product from being used at all, requiring expensive disposal. Further, the oil components in these suspensions may tend to destabilize foams, releasing the gas from foamed cement compositions. The destabilization of the foamed cement composition may exert excessive hydrostatic pressure on the subterranean formation so as to unintentionally fracture the formation. Additional ingredients, such as the organophilic clay, are typically used to increase the viscosity of these oil-based solutions, which may slow the separation of the polymers, extending the shelf life. Further, other ingredients, such as surfactants, may aid in affecting the release of the hydrophilic polymers from the oil-based solution into the aqueous cement composition.

In contrast to previous formulations, the density-matched suspensions made in accordance with embodiments of the present invention may be more stable, for example, due to the matching of densities of the suspending liquid and the solid particle. Thus, while suspending agents may be used to increase the viscosity of the suspending liquids, these ingredients are optional. Further, in certain embodiments, hydrolysis of the suspending liquid when placed in contact with a high-pH material, such as a cement mixture, deposits the solid particle directly into the cement composition where they may fully hydrate, for example. Accordingly, while surfactants may be used to decrease the time required to transfer the hydrophilic polymer into the aqueous cement composition, these components may also be optional. In certain embodiments, hydrolysis of the suspending liquid results in the formation of water-soluble products, such as diols, there may be no residual oil to destabilize the foamed cement composition.

Polymeric fluid-loss-control additives that may be used in the density-matched suspensions in accordance with embodiments of the present invention may generally have densities about the same as the suspending liquid. Where a mixture of hydrophobic liquids are used, for example, the polymeric fluid-loss-control additive may have a density between the upper and lower densities of the hydrophobic liquids used in the suspending liquid, e.g., between about 0.85 g/cm$^3$ (at 25° C.) and 1.4 g/cm$^3$ (at 25° C.) in certain embodiments. For example, types of polymers that may be used in the present techniques include, but are not limited to: cellulose derivatives such as those having densities between about 1.27 g/cm$^3$ (at 25° C.) and 1.37 g/cm$^3$ (at 25° C.), or about 1.32 g/cm$^3$ (at 25° C.); modified-acrylamide copolymers such as those having densities between about 1.30 g/cm$^3$ (at 25° C.) and 1.40 g/cm$^3$ (at 25° C.), or about 1.37 g/cm$^3$ (at 25° C.); acrylic copolymers such as those having densities between about 1.30 g/cm$^3$ (at 25° C.) and 1.40 g/cm$^3$ (at 25° C.), or about 1.37 g/cm$^3$ (at 25° C.); and polyvinylpyrrolidone copolymers such as those having densities between about 1.25 g/cm$^3$ (at 25° C.) and 1.35 g/cm$^3$ (at 25° C.), or about 1.30 g/cm$^3$ (at 25° C.). Other types of materials having higher or lower densities may also be used in embodiments of the density-matched suspensions with the addition of materials to modify the density and/or viscosity of the solution, as discussed below.

Examples of suitable polymeric fluid-loss-control additives that may be used in embodiments of the density-matched suspensions include, but are not limited to: guar gum; hydroxyethyl guar; hydroxypropyl guar; carboxymethyl guar; carboxymethylhydroxyethyl guar; carboxymethylhydroxypropyl guar; cellulose derivatives; lignin or lignite grafted with polymers comprising at least one monomer selected from the group consisting of 2-acrylamido-2-methylpropanesulfonic acid, acrylonitrile and N,N-dimethylacrylamide; hydroxyethyl cellulose; carboxyethylcellulose; carboxymethylcellulose; carboxymethylhydroxyethylcellulose; cellulose grafted with an allylic or a vinylic monomers; polyacrylate; polymethacrylate; polyacrylamide; polyvinyl alcohol; and polyvinylpyrrolidone. Further, the polymers may also include copolymers, derivatives, and graft copolymers of the polymers listed above. Other suitable polymers that may be used in embodiments of the density-matched suspensions include, but are not limited to: (1) a copolymer comprising acrylamide, N-vinyl-N-methylacetamide, and sodium salt of vinyl sulfonate; (2) a copolymer comprising partially hydrolyzed acrylamide, N-vinyl-N-methylacetamide, and 2-acrylamido-2-methylpropane sulfonic acid salt; (3) a copolymer comprising 2-acrylamido-2-methylpropane sulfonic acid salt, N-vinyl-N-methylacetamide, and acrylamide; and (4) a copolymer comprising 2-acrylamido-2-methylpropane sulfonic acid salt, acrylamide, N-vinylpyrrolidone, and acrylic acid.

Suitable polymeric fluid-loss control additives useful in embodiments of the cement compositions of the present techniques may include any of the above-described polymers, copolymers, or combinations thereof. The polymeric fluid-loss-control additive should generally be included in the cement compositions of the present techniques in an amount sufficient to provide the desired fluid-loss control. For example, the polymeric fluid-loss-control additive may be present in an amount in the range of about 0.25% and about 5% bwoc.

Other additives suitable for use in subterranean cementing operations also may be added to embodiments of the cement compositions. Examples of such additives include, but are not limited to, strength-retrogression additives, set accelerators, weighting agents, weight-reducing additives, heavyweight additives, lost-circulation materials, filtration-control additives, dispersants, defoaming agents, and combinations thereof. Specific examples of these, and other, additives include crystalline silica, amorphous silica, salts, fibers, hydratable clays, vitrified shale, microspheres, fly ash, lime, latex, thixotropic additives, combinations thereof and the like. A person having ordinary skill in the art, with the benefit of this disclosure, will readily be able to determine the type and amount of additive useful for a particular application and desired result.

The cement compositions of the present techniques may be prepared in accordance with any suitable technique. For example, the cement composition may be prepared by combining at least cement, water, and a density-matched suspension, wherein the suspension comprises a suspending liquid and solid particle suspended in the suspending liquid. In certain embodiments, the solid particle comprises a polymeric fluid-loss-control additive. In certain embodiments, the suspending liquid may comprise a mixture of two or more hydrophobic liquids that may, for example, hydrolyze when placed in contact with an aqueous liquid to form one or more hydrophilic products. The cement and water, for example, may be combined and mixed for a sufficient period of time to form a pumpable cement composition. Liquid additives, if any, may be mixed with the water prior to combination with the cement, in certain embodiments. For example, the density-matched suspension may be mixed with the water prior to combination with the cement. Alternatively, liquid additives (such as the density-matched suspension) may be added while mixing the cement and water. Dry solid additives, if any, may be dry blended with the cement prior to combination with the water. In certain embodiments, the cement composition then may be pumped to the well bore. If foamed, the surfactant followed by the gas may be injected into the cement composition as the cement composition is being pumped. One of ordinary skill in the art, with the benefit of this disclosure, will recognize other suitable techniques for preparing the cement compositions of the present techniques.

An example of a method of cementing of the present invention comprises: combining at least a cement, water, and a density-matched suspension to form a cement composition, wherein the density-matched suspension comprises a suspending liquid and a solid particle suspended in the suspension liquid; and introducing the cement composition into a well bore. In certain embodiments, the cement composition may a foamed cement composition and further comprise a gas and a surfactant for foaming and/or stabilizing the foamed cement composition, as set forth above. The location to be cemented may be any suitable location, including a space between a wall of the well bore and a conduit disposed therein.

Furthermore, while the proceeding discussion is generally directed to the use of density-matched suspensions in cementing methods, those of ordinary skill in the art, with the benefit of this disclosure, will appreciate that the present technique also encompasses the use of such density-matched suspensions in any variety of different subterranean treatments. For example, the suspensions may be included in any number of well treatment fluids, including, but not limited to, drilling fluids, completion fluid, stimulation fluids and clean-up fluids. Such treatment fluids optionally may comprise any number of additional additives, including, but not limited to, salts, surfactants, fluid-loss-control additives, gas, nitrogen, carbon dioxide, surface-modifying agents, tackifying agents, foamers, corrosion inhibitors, scale inhibitors, catalysts, clay control agents, biocides, friction reducers, antifoam agents, bridging agents, dispersants, flocculants, $H_2S$ scavengers, $CO_2$ scavengers, oxygen scavengers, lubricants, viscosifying agents, breakers, weighting agents (e.g., barite), relative permeability modifiers, resins, particulate materials (e.g., proppant particulates), wetting agents, coating enhancement agents, and the like. Examples of suitable viscosifying agents, include, but are not limited to, colloidal agents (e.g., clays such as bentonite, polymers, guar gum), emulsion-forming agents, diatomaceous earth, biopolymers, synthetic polymers, chitosans, starches, gelatins, and mixtures thereof.

In addition, while the preceding discussion is directed to density-matched suspensions that comprise a polymeric fluid-loss-control additive suspended in a suspending liquid, those of ordinary skill in the art, with the benefit of this disclosure, will appreciate that the density-matched suspensions may be used to deliver a variety of other downhole additives used in particulate form, in accordance with embodiments of the present technique. By way of example, viscosifiers, cement set retarders, lost-circulation materials, swellable elastomers, and other solid-particulate additives may be suspended in a density-matched suspension, in accordance with embodiments of the present invention.

To facilitate a better understanding of the present invention, the following examples of certain aspects of some embodiments are given. In no way should the following examples be read to limit, or define, the entire scope of the invention.

EXAMPLES

To demonstrate settling of solid particles in different fluids, two samples were prepared. In a 250-mL jar, 10 g of a modified-acrylamide copolymer (HALAD® 344 fluid-loss additive, available from Halliburton Energy Services, Inc.) (SG 1.2) was placed in 160 mL of propylene carbonate and 40 mL of butylene carbonate (SG 1.19). As a control, in another 250-mL jar, 10 g of the modified-acrylamide copolymer (same) was placed in 200 mL of mineral oil (SG 0.88). Both jars were placed on a stir plate and fully mixed with a stir bar and spatula. The viscosity of each suspension was measured using a FANN® viscometer. The viscosity measurements are provided in the table below.

TABLE 1

| | FANN ® Viscometer Readings | |
| --- | --- | --- |
| RPM | Carbonate Suspension | Mineral Oil Suspension |
| 600 | 8 | 215 |
| 300 | 4.5 | 113 |
| 200 | 3 | 78 |
| 100 | 1.5 | 41 |

After the viscosity measurements, each sample was left static at room temperature for 24 hours. Although both samples showed settling, the carbonate suspension showed less propensity to settle. Although the mineral oil suspension was thicker, virtually all of the polymer had settled in the mineral oil. In the carbonate suspension, there was some settling, but much of the polymer was still in suspension. Also, by placing the carbonate suspension back on the stir plate, the settled polymer was easily re-suspended. However, the mineral oil suspension did not easily re-suspend by placement on the stir plate without additional agitation from a spatula.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by any amount (e.g., 1 percent, 2 percent, 5 percent, or, sometimes, 10 to 20 percent). Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Moreover, the indefinite articles "a" or "an", as used in the claims, are defined herein to mean one or more than one of the element that it introduces. Also, the terms in the claims have their plain, ordinary meaning unless otherwise explicitly and clearly defined by the patentee.

What is claimed is:
1. A method comprising:
   selecting a target density for a suspension based at least on a solid particle to be suspended in a density-matched suspension;

selecting two or more hydrophobic liquids, wherein
at least one of the hydrophobic liquids has a density higher than the target density and at least one of the hydrophobic liquids has a density lower than the target density, and
the hydrophobic liquids hydrolyze when placed in contact with an aqueous fluid to form hydrophilic products;
combining the hydrophobic liquids to form a mixture having about the target density; and
combining the mixture and the solid particle to be suspended to form the density-matched suspension.

2. The method of claim 1, wherein at least one of the hydrophobic liquids comprises a hydrophobic liquid selected from the group consisting of an acetal, a ketal, and an orthoester.

3. The method of claim 1, wherein at least one of the hydrophobic liquids comprises a hydrophobic liquid selected from the group consisting of propylene carbonate, butylene carbonate, ethylene carbonate, and a glycerin carbonate.

4. The method of claim 1, wherein the hydrophobic liquids hydrolyze when the pH of the aqueous fluid is greater than 9.

5. The method of claim 1, wherein the hydrophobic liquids hydrolyze when the pH of the aqueous fluid is less than about 5.

6. The method of claim 1, wherein the density of the hydrophobic liquids is within about 1% of the density of the solid particle.

7. The method of claim 1, wherein the mixture comprises cyclic carbonates.

8. The method of claim 1, wherein the density-matched suspension comprises an organophilic clay.

9. The method of claim 1, wherein the solid particle comprises a polymeric fluid-loss-control additive.

10. The method of claim 1, wherein the solid particle has a density in the range of 0.85 grams per cubic centimeter to 1.4 grams per cubic centimeter.

11. The method of claim 1, further comprising combining the density-matched suspension and a cement to form a cement composition.

* * * * *